United States Patent [19]

Russell et al.

[11] 4,010,146

[45] Mar. 1, 1977

[54] POLYOL BLENDS AND POLYURETHANE PREPARED THEREFROM

[75] Inventors: David D. Russell, Atwater; George Shkapenko, Akron, both of Ohio

[73] Assignee: Samuel Moore and Company, Aurora, Ohio

[22] Filed: Sept. 29, 1975

[21] Appl. No.: 617,655

[52] U.S. Cl. .................. 260/77.5 AM; 260/2.5 AP
[51] Int. Cl.$^2$ ...................................... C08G 18/00
[58] Field of Search .......................... 260/77.5 AM

[56] References Cited

UNITED STATES PATENTS 3,627,714  12/1971  Merkl ................. 260/77.5 AM X
3,915,937  10/1975  O'Shea ................... 260/77.5 AM

*Primary Examiner*—Lewis T. Jacobs
*Attorney, Agent, or Firm*—Clelle W. Upchurch

[57] ABSTRACT

A poly(oxyethylene-oxypropylene)glycol and poly(tetramethylene ether)glycol are blended together and the resulting blend and a chain extender are reacted with an organic diisocyanate under conditions which produce a thermoplastically processible polyurethane elastomer. The polyurethane elastomer can be used to advantage for making the sheath of a hydraulic hose.

7 Claims, No Drawings

POLYOL BLENDS AND POLYURETHANE PREPARED THEREFROM

This invention relates generally to poly(alkyleneether)glycols and polyurethane elastomers prepared therefrom and, more particularly, to a novel blend of poly(ethylene oxide) poly(1,2-propylene oxide)glycol and poly(tetramethylene ether)glycol and polyurethane elastomers prepared therefrom.

It has been proposed before to prepare polyurethane elastomers from poly(tetramethylene ether)glycols in the Hill, U.S. Pat. No. 2,929,800 and to prepare polyurethane elastomers from poly(ethylene-ether)glycols in the Windemuth, U.S. Pat. 2,948,691 and from poly(propylene ether)glycols in the Price, U.S. Pat. No. 2,866,744. It is also proposed in U.S. Pat. No. 2,899,411 to prepare polyurethane elastomers suitable for thermoplastic processing such as by extrusion from poly(methylene ether)glycols. While it has been proposed in various patents to prepare polyurethane elastomers suitable for extrusion of similar thermoplastic processing from poly(propylene ether)glycol polymers, it has been the practice commercially to make such elastomers from poly(tetramethylene ether)glycols instead of poly(ethylene ether)glycol or poly(propylene ether)glycols because of the superior processing characteristics of the resulting polyurethane and also because of its improved hydrolytic stability and other physical characteristics. The poly(tetramethylene ether)glycols are relatively expensive, however, and cannot be used in making some finished products because the resulting costs of the article would be excessive.

It is therefore an object of this invention to provide a polyurethane elastomer prepared from a polyol containing a poly(propylene ether)glycol and having improved tensile strength, elongation and tensile modulus which adapt it to be thermoplastically processed such as, for example, by extrusion. Another object of the invention is to provide a thermoplastically processible polyurethane elastomer prepared from a polyol containing poly(propylene ether)glycol and having properties which adapt it to be used instead of a polyurethane prepared from the more expensive poly(tetramethylene ether)glycol. A still further object of the invention is to provide a method for making a polyurethane elastomer suitable for use in extrusion processes to prepare extruded elastomeric articles such as, for example, a sheath or core tube for a hydraulic hose or the like.

The foregoing objects and others are accomplished in accordance with this invention, generally speaking, by providing (A) a physical blend of (1) a block copolymer of ethylene oxide and 1,2-propylene oxide having the formula

HO⁺(C₂H₄ - O)ₓ(C₃H₆ - O)ᵧ(C₂H₄ - O)ᵤH wherein x and z are integers of from 0 to 22 and y is an integer of from 1 to 20 and the molecular weight of the copolymer is between 500 and 3000 and (2) poly(tetramethylene ether)glycol having a molecular weight of from about 500 to about 3000; (B) a substantially non-porous thermoplastically processible polyurethane elastomer prepared by reacting the blend (A) and a low molecular weight chain extender having as its only reactive hydrogen groups primary hydroxyl groups with an organic diisocyanate, and (C) a hydraulic hose having a core tube and/or sheath shaped by extruding the polyurethane (B). The molar ratio of $-(CH_2-CH_2-O)-$ to $-(C_3H_6-O)-$ in the block copolymer may be from about 0.05% to 95%, respectively. The block copolymer should have a primary hydroxyl content of from about 60% to 100% by weight. The blend (A) may contain from about 5 parts by weight to about 95 parts by weight of the ethylene oxide tipped block copolymer (1) and the remainder poly(tetramethylene ether)glycol (2).

It has been found that a polyurethane prepared from a blend A of the block copolymer (1) defined herein and a poly(tetramethylene ether)glycol (2) has physical characteristics which adapt it to be used to advantage for making articles by thermoplastic processing such as, for example, extrusion, injection molding and the like with a significant reduction in material costs where it is substituted for a polyurethane in which poly(tetramethylene ether)glycol is the poly(alkylene ether)glycol.

The polyurethane may be prepared by reacting the blend (A) and a suitable chain extender with an organic diisocyanate under conditions which produce a product which can be thermoplastically processed. Such processes are described by Saunders and Frisch in Polyurethanes:Chemistry and Technology, Part II pp. 376-384, published by Interscience Publishers, the disclosure of which is incorporated herein by reference. Any suitable low molecular weight glycol having only primary hydroxyl groups such as, for example, ethylene glycol, 1,3 propane glycol, 1,4-butane diol, diethylene glycol, bis-hydroxyethyl ether of hydroquinone, 1,5-pentane diol, bis-hydroxy ethylene terephthalate, and mixtures thereof may be used. While any suitable organic diisocyanate including those listed in the Frisch and Saunders book and in U.S. Pat. No. 2,948,691 may be used, it is preferred to use 4,4-diphenyl methane diisocyanate (MDI). The ratio of -NCO groups to total -OH groups in the reaction mixture should be from about 1.07 to 1.01 to 1. The molar ratio of polyols (1) and (2) to chain extender should be from about 6.5 to 1.5 to 1.

The process for making the polyurethane involves, generally speaking, mixing the polyols (1) and (2) together in the correct proportions, heating the resulting blend to de-areate and remove moisture therefrom, mixing the resulting substantially anhydrous polyol with the chain extender, mixing the mixture of polyol and chain extender with organic diisocyanate, pouring the resulting mixture before it solidifies over a suitable substrate and after chemical reaction has proceeded to the point where the coating on the substrate has solidified, heating the coating until the product has properties which adapt it for thermoplastic processing. Preferably, the organic diisocyanate is mixed with the polyol blend A and chain extender at a temperature of about 125° F to 200° F while the polyol blend and chain extender are at a temperature of about 150° – 160° F.

It has been found that the blends of polyols contemplated by this invention when reacted with a suitable organic diisocyanate such as MDI consistently produce an elastomeric polyurethane having a tensile strength of at least about 3500 psi and an elongation at break of at least about 300% and a modulus at 50% elongation of at least about 900 psi.

The invention is further clarified and described by the following non-limiting examples where all parts are by weight unless otherwise specified.

EXAMPLE 1

About 53 parts poly(oxyethylene-poly(oxypropylene)glycol having a molecular weight of about 1000 and containing between 85 and 90% by weight primary hydroxyl groups are mixed with 50 parts poly(tetramethylene ether)glycol and the resulting polyol blend is heated to about 150° F in a vacuum oven for about 2 under about 27 inches vacuum until the blend is de-areated and dehydrated. About 25.2 parts 1,4-butane diol are added to the mixture and about 97.8 parts MDI which has been heated to about 150° C are rapidly mixed with the polyol blend-1,4-butane diol mixture. After a substantially uniform mixture is obtained, the liquid reaction mixture is poured over a Teflon coated plate and heated in an oven for about 16 hours at 150° F.

The resulting polyurethane elastomer has the following properties:

| | |
|---|---|
| Tensile strength (psi) | 6135 |
| 50% modulus (psi) | 1650 |
| elongation at | 410 |
| Vicat softening pt (degrees F) | 292 |

The physical and thermal properties of this product are such that it can be used to advantage to extrude a core tube or sheath for a hydraulic hose.

EXAMPLE 2

This example is the same as Example 1 with the exception that about 27.9 parts 1,4-butane diol and about 105.6 MDI are used. The physical properties of the elastomer are as follows:

| | |
|---|---|
| Tensile (psi) | 5890 |
| 50% modulus (psi) | 2000 |
| elongation at break % | 380 |
| vicat softening pt (degrees F) | 364 |

EXAMPLE 3

This example is the same as Example 1 except about 22.5 parts 1,4-butane diol and about 90.1 parts MDI are used. The physical properties of the elastomer are:

| | |
|---|---|
| Tensile (psi) | 4560 |
| 50% modulus (psi) | 1525 |
| elongation at break % | 410 |
| Vicat softening pt (degrees F) | 257 |

EXAMPLE 4

This example is similar to Example 1 except about 63.7 parts of poly(oxyethylene-oxypropylene)glycol, about 40 parts poly(tetramethylene ether)glycol, about 32.8 parts of diethylene glycol and about 97.8 parts of MDI are used.

| | |
|---|---|
| Tensile (psi) | 4765 |
| 50% modulus (psi) | 1205 |
| elongation at break % | 425 |
| Vicat softening pt (degrees F) | 187 |

EXAMPLE 5

This example is a comparative example and is the same as Example 1 except that instead of a blend A of polyols, the polyether glycol is 53.1 parts poly(oxyethylene-oxypropylene)glycol containing approximately 90% primary hydroxyl groups, the chain extender is about 16.4 parts di-ethylene glycol and about 52.8 parts MDI are used. The physical properties of the resulting elastomer are:

| | |
|---|---|
| Tensile (psi) | 5475 |
| 50% modulus (psi) | 630 |
| elongation at break % | 425 |
| vicat softening pt (degrees F) | 179 |

EXAMPLE 6

The example is like Example 1 except that instead of using a blend of polyols, only poly(oxyethylene-oxypropylene)glycol containing approximately 90% primary hydroxy groups is used. About 106.2 parts of the polyol are mixed with about 25.2 parts 1,4-butane diol and about 97.8 parts MDI. The elastomer has the following physical properties:

| | |
|---|---|
| Tensile (psi) | 2500 |
| 50% modulus (psi) | 1530 |
| Elongation at break % | 400 |
| Durameter Shore A | 95 |
| Vicat softening pt (degrees F) | 244 |

EXAMPLE 7

This example is like Example 1 with the exception that only poly(tetramethylene ether)glycol is used as the polyol. The polyol has a molecular weight of about 1000. About 50 parts of the polyol are mixed with about 10.4 parts 1,4-butane diol and about 42.5 parts MDI. The resulting elastomer has the following properties:

| | |
|---|---|
| Tensile (psi) | 6000 |
| 50% modulus (psi) | 1500 |
| Elongation at break % | 400 |
| Durameter, Shore A | 95 |
| Vicat softening pt (degrees F) | 270 |

Although the invention has been described in detail for the purposes of illustration, it is to be understood that such detail is solely for that purpose and variations can be made therein by those skilled in the art without departing from the spirit and scope of the invention except that it may be limited by the claims.

What is claimed is:

1. A thermoplastically processible polyurethane prepared by reacting an organic diisocyanate, a low molecular weight glycol chain extender having only primary hydroxyl groups and a blend of from about 5 to about 95 parts by weight per 100 parts of a block copolymer of ethylene oxide and 1,2-propylene oxide having the formula

wherein $x$ and $z$ are integers of from 0 to 22 and $y$ is an integer of from 1 to 20 and the molecular weight of the copolymer is between 500 and 3000 and the remainder poly(tetramethylene ether)glycol having a molecular weight of from about 500 to about 3000, said block copolymer containing from about 60 to about 100 percent primary hydroxyl groups.

2. A hydraulic hose having a sheath prepared by extrusion of the polyurethane of claim 1.

3. The polyurethane of claim 1 wherein the organic diisocyanate is MDI.

4. The polyurethane of claim 1 where the chain extender is diethylene glycol.

5. The polyurethane of claim 1 wherein the chain extender is 1,4-butane diol.

6. The polyurethane of claim 1 wherein the chain extender is bis-hydroxy-ethylene terephthalate.

7. The polyurethane of claim 1 wherein the chain extender is bis-hydroxy ethyl ether of hydroquinone.

* * * * *